United States Patent
Sawado

(10) Patent No.: US 8,866,977 B2
(45) Date of Patent: Oct. 21, 2014

(54) PROJECTOR

(75) Inventor: Ayae Sawado, Kai (JP)

(73) Assignee: Seiko Epson Corporation, Tokyo (JP)

(*) Notice: Subject to any disclaimer, the term of this patent is extended or adjusted under 35 U.S.C. 154(b) by 168 days.

(21) Appl. No.: 13/422,340

(22) Filed: Mar. 16, 2012

(65) Prior Publication Data

US 2012/0242916 A1 Sep. 27, 2012

(30) Foreign Application Priority Data

Mar. 23, 2011 (JP) .................................. 2011-064008

(51) Int. Cl.
*G02F 1/1335* (2006.01)
*H04N 9/31* (2006.01)

(52) U.S. Cl.
CPC ........ *G02F 1/133553* (2013.01); *H04N 9/3167* (2013.01)
USPC ............................................................ 349/5

(58) Field of Classification Search
CPC ............... G02F 1/133536; G02F 1/133553; G02F 2001/133531; H04N 9/3167; G03B 21/60
USPC ............................................................ 349/5
See application file for complete search history.

(56) References Cited

U.S. PATENT DOCUMENTS

| | | | |
|---|---|---|---|
| 2003/0227597 A1* | 12/2003 | Silverstein et al. | 353/20 |
| 2004/0263806 A1 | 12/2004 | Silverstein et al. | |
| 2007/0030424 A1 | 2/2007 | Shimizu et al. | |
| 2007/0076133 A1* | 4/2007 | Shimizu et al. | 349/5 |
| 2007/0195272 A1* | 8/2007 | Hendrix et al. | 353/20 |
| 2008/0266470 A1* | 10/2008 | Muramoto | 349/8 |
| 2009/0256976 A1* | 10/2009 | Shimizu et al. | 349/9 |

FOREIGN PATENT DOCUMENTS

| | | |
|---|---|---|
| JP | 2004-46156 A | 2/2004 |
| JP | 2007-212997 A | 8/2007 |

* cited by examiner

*Primary Examiner* — Michael Caley
*Assistant Examiner* — Jia Pan
(74) *Attorney, Agent, or Firm* — ALG Intellectual Property, LLC

(57) ABSTRACT

When axes are projected to a reference surface perpendicular in the thickness direction of a liquid crystal layer, a rotational angle $\phi_0$ of an alignment axis of a liquid crystal layer from a reference direction on the reference surface, a rotational angle $\phi_1$ of a transmission axis of an incident-side polarizing plate from the reference direction, a rotational angle $\phi_2$ of a transmission axis of a wire grid element from the reference direction, and a rotational angle $\phi_3$ of a transmission axis of an exit-side polarizing plate from the reference direction satisfy all the equations below:

$44° \leq \phi_0 - \phi_2 < 45°$ or $45° < \phi_0 - \phi_2 \leq 45°$, $f1 \leq \phi_1 \leq f2$, where $f1 = 0.191 \times \phi_2{}^2 + 0.986 \times \phi_2 - 14.435$ and $f2 = 0.191 \times \phi_2{}^2 + 0.986 \times \phi_2 + 14.435$, and $g1 \leq \phi_3 - 90° \leq g2$, where $g1 = 0.064 \times \phi_2{}^3 + 0.841 \times \phi_2{}^2 + 1.525 \times \phi_2 - 1.46$ and $g2 = 0.064 \times \phi_2{}^3 - 0.841 \times \phi_2{}^2 + 1.525 \times \phi_2 + 1.46$.

7 Claims, 6 Drawing Sheets

PROJECTOR

BACKGROUND

1. Technical Field

The present invention relates to a projector.

2. Related Art

Hitherto, a reflection type projector has been known as one of the liquid crystal projectors (for example, see JP-A-2004-46156). For example, the reflection type projector includes an illumination optical system, a wire grid element, a reflection type liquid crystal panel, and a projection optical system.

Light emitted from the illumination optical system is incident on a liquid crystal panel via a polarization separating element. The light incident on the liquid crystal panel is modulated and reflected by the liquid crystal panel. The light reflected by the liquid crystal panel is incident again on the polarization separating element and is separated into polarized light for showing an image and polarized light for showing a reversed image. The projection optical system projects the polarized light for showing the image to a screen or the like to display the image.

In some cases, the reflection type liquid crystal panel is configured to include a vertical alignment mode (hereinafter, referred to as a VA mode) liquid crystal layer advantageous to improve a contrast ratio. In the VA mode liquid crystal layer, a pretilt is given in a predetermined direction so as to have an alignment property in many cases. When the pretilt is given in the liquid crystal layer, disclination can be prevented from occurring. However, refractive index anisotropy may occur in the liquid crystal layer when no electric field is applied.

To remove the refractive index anisotropy, an optical compensation plate may be provided in addition to the liquid crystal layer so that the refractive index becomes isotropic. Further, a technique has been suggested to reduce the refractive index anisotropy of the liquid crystal layer when no electric field is applied (for example, JP-A-2007-212997). In JP-A-2007-212997, in a liquid crystal panel in which a liquid crystal layer is interposed between a pair of substrates, the alignment axis of the liquid crystal layer is different at one and the other of the pair of substrates.

In the projector, the contrast ratio is expected to be newly improved, and thus the projector with the above-described configuration can be allowed to be improved. For example, in the liquid crystal panel, the alignment axis of the liquid crystal layer may sometimes be deviated from a predetermined direction due to a manufacture error or the like. When the alignment axis of the liquid crystal layer is deviated from the predetermined direction, a rotational angle between the optical axis of a polarizing plate, a wire grid element, or the like and the alignment axis of the liquid crystal layer may be deviated from a predetermined rotational angle. As a result, a ratio of the polarized light, which is included in the light projected by the projection optical system, for showing a reverse image may be increased, thereby deteriorating the contrast ratio of the projected image.

SUMMARY

An advantage of some aspects of the invention is that it provides a projector capable of preventing a contrast ratio from deteriorating due to a deviation in a relative rotational angle of the optical axis of an optical element such as a liquid crystal panel or a wire grid element.

According to an aspect of the invention, there is provided a projector including: an illumination optical system; an incident-side polarizing plate which is disposed at a position at which light emitted from the illumination optical system is incident and through which polarized light parallel to a transmission axis passes; a wire grid element which is disposed at a position at which the light emitted from the illumination optical system and passing through the incident-side polarizing plate is incident, through which polarized light parallel to a transmission axis passes, and from which polarized light perpendicular to the transmission axis is reflected; a reflection type liquid crystal panel which is disposed at a position at which the light emitted from the illumination optical system and passing through the wire grid element is incident; an exit-side polarizing plate which is disposed at a position at which light reflected by the wire grid element in the light modulated and reflected by the liquid crystal panel and incident on the wire grid element is incident and through which polarized light parallel to a transmission axis passes; and a projection optical system which projects the light modulated by the liquid crystal panel and passing through the exit-side polarizing plate. In regard to an alignment axis parallel to a direction, in which a director of a liquid crystal molecule in a liquid crystal layer of the liquid crystal panel is projected to a surface perpendicular to a thickness direction of the liquid crystal layer, the transmission axis of the incident-side polarizing plate and the transmission axis of the wire grid element which are projected to a reference surface perpendicular in the thickness direction of the liquid crystal layer of the liquid crystal panel, the transmission axis of the exit-side polarizing plate which is projected to the wire grid element and is further projected to the reference surface, a rotational angle $\phi_0$ of the alignment axis of the liquid crystal layer from a reference direction parallel to the reference surface, a rotational angle $\phi_1$ of the transmission axis of the incident-side polarizing plate from the reference direction, a rotational angle $\phi_2$ of the transmission axis of the wire grid element from the reference direction, and a rotational angle $\phi_3$ of the transmission axis of the exit-side polarizing plate from the reference direction satisfy all Equations (1) to (3) below:

$$44° \leq \phi_0 - \phi_2 < 45° \text{ or } 45° < \phi_0 - \phi_2 \leq 46° \tag{1}$$

$$f1 \leq \phi_1 \leq f2 \tag{2},$$

where $f1 = 0.191 \times \phi_2^2 + 0.986 \times \phi_2 - 14.435$ and $f2 = -0.191 \times \phi_2^2 + 0.986 \times \phi_2 + 14.435$, and $$g1 \leq \phi_3 \leq g2 \tag{3},$$

where $g1 = 0.064 \times \phi_2^3 + 0.841 \times \phi_2^2 + 1.525 \times \phi_2 - 1.46$ and $g2 = 0.064 \times \phi_2^3 - 0.841 \times \phi_2^2 + 1.525 \phi_2 + 1.46$.

In the projector, the rotational angles $\phi_0$ to $\phi_3$ satisfy all Equations (1) to (3). Since the minimum value of a contrast ratio is 80% or more of the maximum value, a deterioration in the contrast ratio can be suppressed so that an observer scarcely recognizes the deterioration in the contrast ratio.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
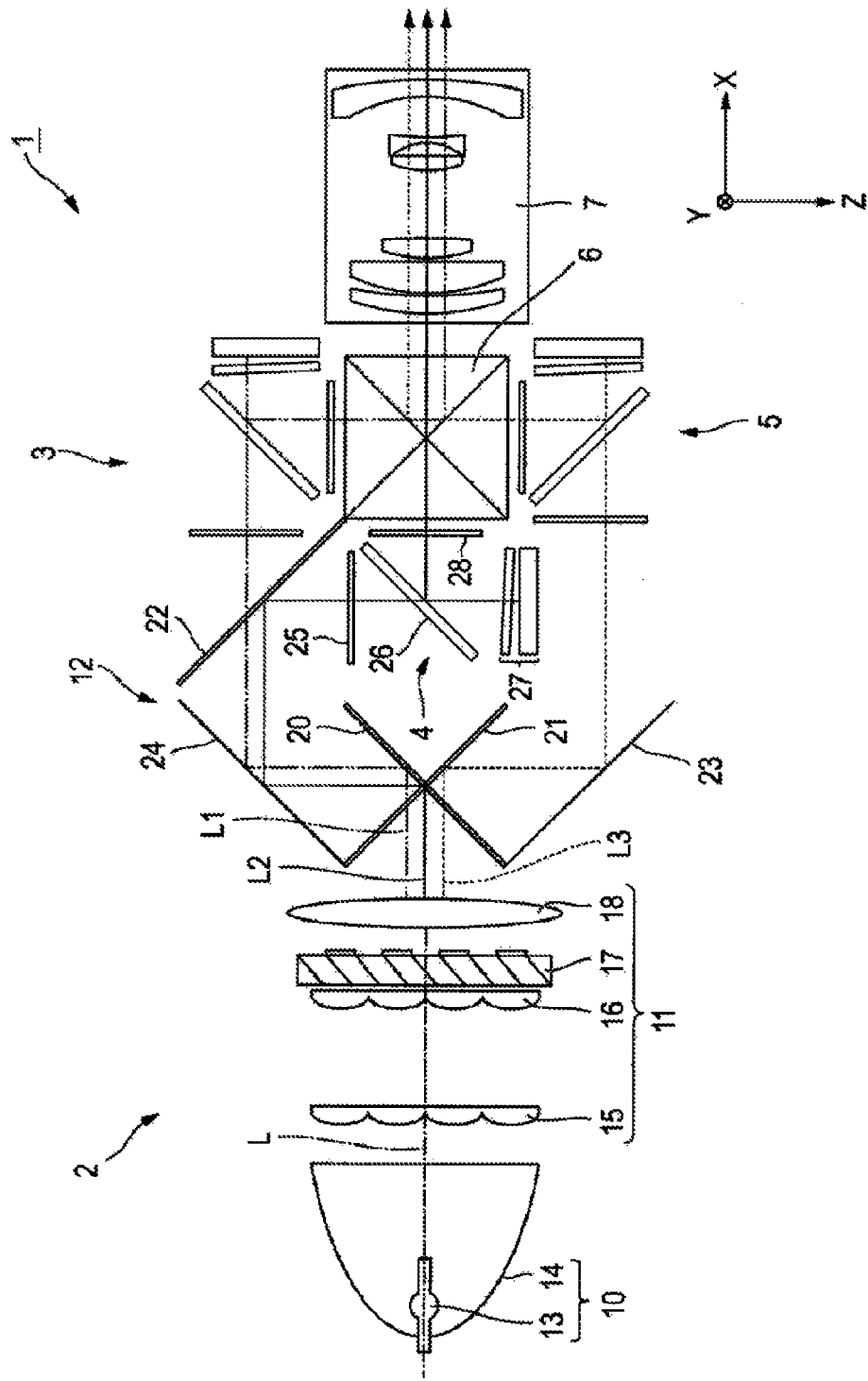
FIG. 1 is a diagram illustrating the overall configuration of a projector according to an embodiment.

Hereinafter, an embodiment of the invention will be described with reference to the drawings. The size or scale of the configuration in the drawings used for the description may be different from the actual size or scale.

Figure 2:
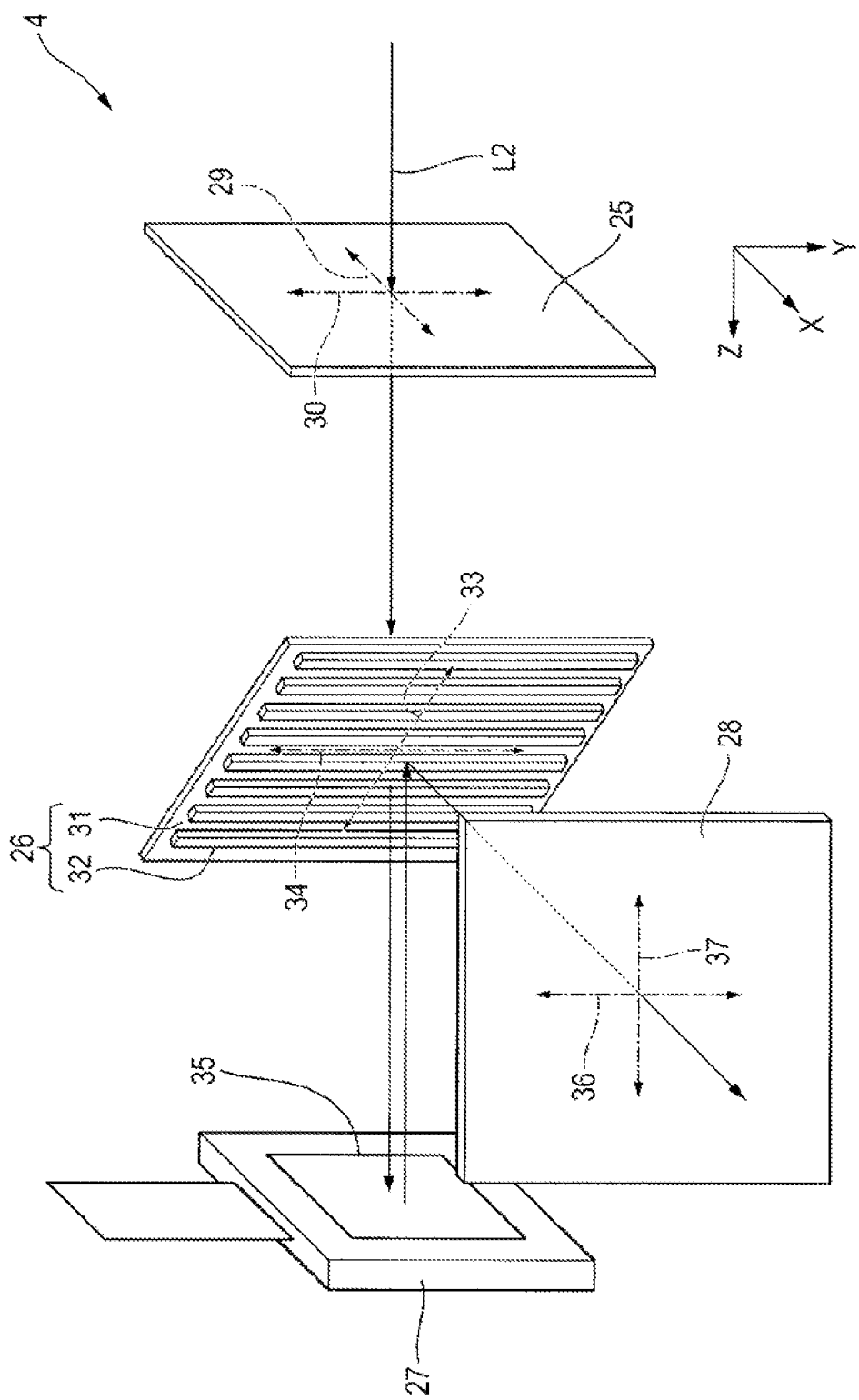
FIG. 2 is a diagram schematically illustrating the configuration of an image forming system according to the embodiment.
Figure 3:
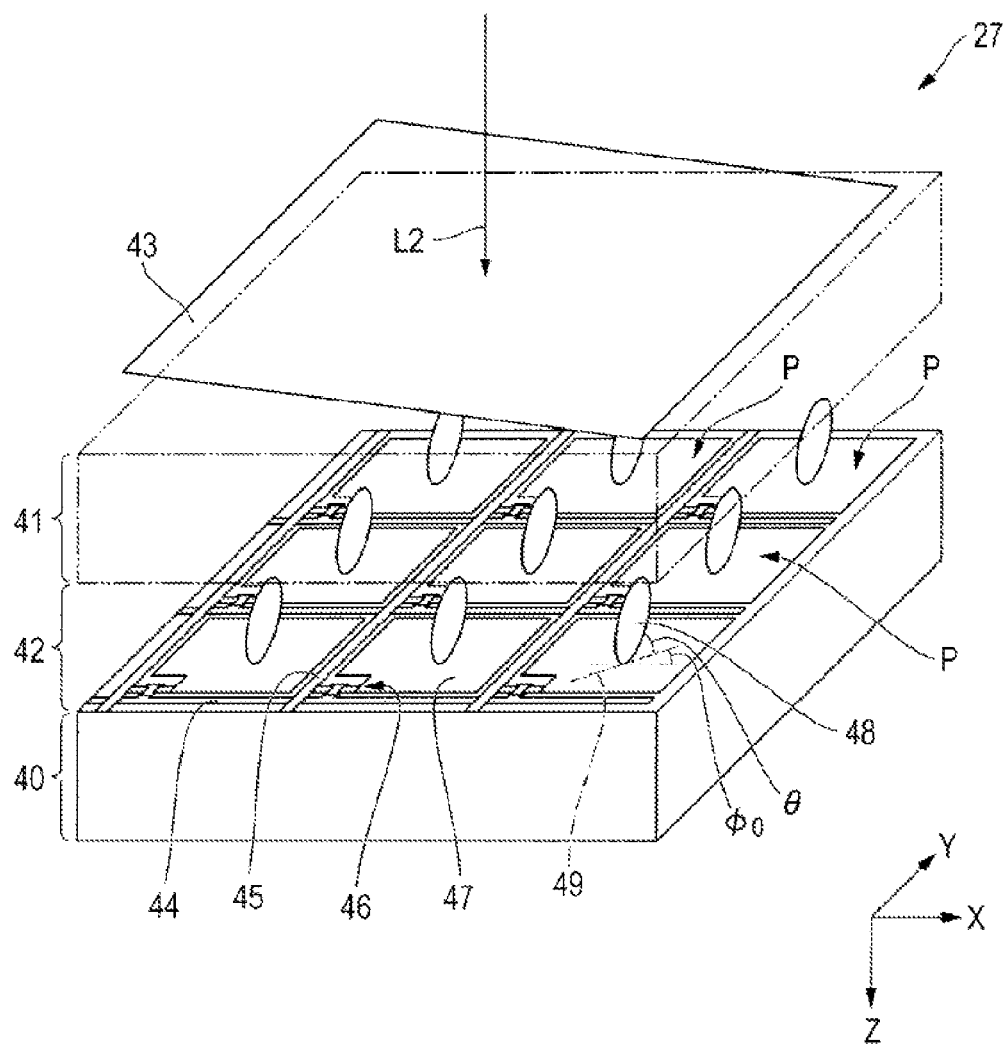
FIG. 3 is a diagram schematically illustrating the configuration of a liquid crystal panel according to the embodiment.

FIG. 1 is a diagram illustrating the overall configuration of a projector according to an embodiment. FIG. 2 is a diagram schematically illustrating the configurations of an image forming system and a color synthesizing unit according to the embodiment. FIG. 3 is a diagram schematically illustrating the configuration of a liquid crystal panel.

A projector 1 shown in FIG. 1 includes an illumination optical system 2, a blue image forming system 3, a green image forming system 4, a red image forming system 5, a color synthesizing unit 6, and a projection optical system 7.

The illumination optical system 2 can separately emit blue light L1, green light L2, and red light L3. The color image forming systems are arranged so as to have a one-to-one correspondence relationship with the respective light emitted from the illumination optical system 2, and thus can modulate the corresponding color light to form images of the respective colors. The color synthesizing unit 6 can synthesize the light for showing the images of the three colors formed by the three image forming systems. The projection optical system 7 can project the light synthesized by the color synthesizing unit 6 to a projection surface such as a wall or a screen.

The illumination optical system 2 according to this embodiment includes a light source unit 10, an integrator optical system 11, and a color separation optical system 12. The light source unit 10 can emit white light L which includes the blue light L1 with a wavelength equal to or greater than 450 nm and less than 495 nm, the green light L2 with a wavelength equal to or greater than 495 nm and less than 570 nm, and the red light L3 with a wavelength equal to or greater than 620 nm and less than 750 nm. The integrator optical system 11 can uniformalize the illuminance of the white light L emitted from the light source unit 10 and align a polarized state. The color separation optical system 12 can separate the white light L emitted from the integrator optical system 11 into the blue light L1, the green light L2, and the red light L3.

The light source unit 10 according to this embodiment includes a light source lamp 13 that emits white light and a reflecting mirror 14 that has a reflection surface with a rotation paraboloid shape. The white light emitted from the light source lamp 13 is reflected in one direction from the reflecting mirror 14 and becomes a substantially parallel light flux. The light source lamp 13 is configured by, for example, a metal halide lamp, a xenon lamp, a high-pressure mercury lamp, or a halogen lamp. The light is incident on the integrator optical system 11 by the reflecting mirror 14. The reflecting mirror 14 may have a reflection surface with a rotation elliptical shape. In this case, a parallelizing lens may be used to parallelize the white light exiting from the reflecting mirror.

The integrator optical system 11 according to this embodiment includes a first lens array 15, a second lens array 16, a polarization converting element 17, and a superimposing lens 18.

The first lens array 15 and the second lens array 16 each have a plurality of microlenses arranged two-dimensionally on a plane perpendicular to the optical axis of the light source unit 10. The microlenses of the first lens array 15 are arranged to have a one-to-one correspondence relationship with the microlenses of the second lens array 16. The plurality of microlenses have a substantially rectangular shape, which is similar to that of an illumination region 35 of a liquid crystal panel 27 (see FIG. 2) described below, on the plane perpendicular to the optical axis of the light source unit 10.

The polarization converting element 17 includes a plurality of cells arranged two-dimensionally on the plane perpendicular to the optical axis of the light source unit 10. The cells of the polarization converting element 17 are arranged to have a one-to-one correspondence relationship with the microlenses of the second lens array 16. The plurality of cells each have a polarization beam splitter film (hereinafter, referred to as a PBS film), a ½ phase plate, and a reflecting mirror.

The white light L incident on the first lens array 15 from the light source unit 10 is condensed into the respective microlenses and is divided into a plurality of partial light fluxes. The partial light flux exiting from each microlens of the first lens array 15 is imaged in the microlens of the second lens array 16 corresponding to this microlens to form a secondary light source in the microlens. The partial light flux exiting from each microlens of the second lens array 16 is incident on the cell of the polarization converting element 17 corresponding to this microlens.

The polarization converting element 17 is disposed in a light path between the second lens array 16 and the superimposing lens 18. The partial light flux incident on each cell of the polarization converting element 17 is separated into P-polarized light and S-polarized light for the PBS film. One polarized light flux separated from the partial light flux is reflected from the reflecting mirror, and then passes through the ½ phase plate so that the polarized state can be aligned with the other polarized light. In this embodiment, each cell of the polarization converting element 17 can align the polarized state of the partial light flux incident on each cell to the P-polarized light with respect to a wire grid element 26 (which is described later) of each image forming system. The plurality of partial light fluxes emitted from the plurality of cells of the polarization converting element 17 are refracted by the superimposing lens 18, and thus are superimposed on a pixel region 35 of the liquid crystal panel 27 of each image forming system.

The color separation optical system 12 includes a first dichroic mirror 20, a second dichroic mirror 21, a third dichroic mirror 22, a first reflecting mirror 23, and a second reflecting mirror 24. The first dichroic mirror 20 has a property of transmitting the red light L3 and reflecting the green light L2 and the blue light L1. The second dichroic mirror 21 has a property of reflecting the red light L3 and transmitting the green light L2 and the blue light L1. The third dichroic mirror 22 has a property of reflecting the green light L2 and transmitting the blue light L1. The first dichroic mirror 20 and the second dichroic mirror 21 are almost perpendicular to each other and are disposed to form nearly 45° with the optical axis of the integrator optical system 11.

In the white light L incident on the color separation optical system 12, the red light L3 is reflected from the second dichroic mirror 21, is reflected from the first reflection mirror 23, and then is incident on the red image forming system 5. In the white light L incident on the color separation optical system 12, the blue light L1 and the green light L2 are reflected from the first dichroic mirror 20, are reflected from a second reflection mirror 24, and then is incident on the third dichroic mirror 22. The green light L2 incident on the third dichroic mirror 22 is reflected from the third dichroic mirror 22 and is incident on the green image forming system 4. The blue light L1 incident on the third dichroic mirror 22 passes through the third dichroic mirror 22 and is incident on the blue image forming system 3.

The blue image forming system 3, the green image forming system 4, and the red image forming system 5 have almost the same configuration. In this embodiment, the configuration of the green image forming system 4 will be described as a representative example of the image forming systems. The green image forming system 4 shown in FIG. 2 includes an incident-side polarizing plate 25, a wire grid element 26, a liquid crystal panel 27, and an exit-side polarizing plate 28.

The green light L2 emitted from the color separation optical system 12 is incident on the incident-side polarizing plate 25. The incident-side polarizing plate 25 has a property of transmitting linearly polarized light parallel to a transmission axis 29 and absorbing linearly polarized light parallel to an absorption axis 30 perpendicular to the transmission axis 29. In the green light L2 incident on the incident-side polarizing plate 25 from the color separation optical system 12, the green light L2 passing through the incident-side polarizing plate 25 is incident on the wire grid element 26.

The wire grid element 26 is disposed to be inclined by an angle of nearly 45° with respect to the travel direction of the green light L2 incident on the wire grid element 26 from the incident-side polarizing plate 25. The wire grid element 26 according to this embodiment includes a dielectric layer 31 made of glass or the like and a plurality of metal wires 32 formed on the surface or a surface layer of the dielectric layer 31 and extending parallel to each other.

The wire grid element 26 has a property of transmitting the linearly polarized light perpendicular to the metal wires 32 and the linearly polarized light parallel to the metal wires 32. In other words, in the wire grid element 26, a transmission axis 33 is perpendicular to the metal wires 32 and a reflection axis 34 is parallel to the metal wires 32. In the green light L2 incident on the wire grid element 26 from the incident-side polarizing plate 25, the green light L2 passing through the wire grid element 26 is incident on the liquid crystal panel 27.

The liquid crystal panel 27 includes a plurality of pixels P arranged two-dimensionally. In this embodiment, one of two arrangement directions of the pixels P is almost parallel to an X direction and the other of the two arrangement directions of the pixels P is almost parallel to a Y direction. In the following description, a direction perpendicular to either of the two arrangement directions of the pixels in the liquid crystal panel is the normal direction of the liquid crystal panel. The normal direction of the liquid crystal panel is almost parallel to the thickness direction of the liquid crystal layer of the liquid crystal panel.

The green light L2 passing through the wire grid element 26 is incident on a region (the pixel region 35) where the plurality of pixels P are arranged. The liquid crystal panel 27 is disposed such that the thickness direction of the liquid crystal layer 42 (see FIG. 3) is almost parallel to the travel direction of the green light L2 incident on the liquid crystal panel 27 from the wire grid element 26.

The green light L2 incident on the liquid crystal panel 27 from the wire grid element 26 is modulated and reflected by the liquid crystal panel 27, and thus the travel direction of the green light L2 is changed by nearly 180° from the travel direction of the green light L2 before the green light L2 is incident on the liquid crystal panel 27. The green light L2 exiting from the liquid crystal panel 27 is incident again on the wire grid element 26.

In the green light L2 incident on the wire grid element 26 from the liquid crystal panel 27, the green light L2 reflected from the wire grid element 26 is incident on the exit-side polarizing plate 28. The exit-side polarizing plate 28 has a property of transmitting the linearly polarized light parallel to a transmission axis 36 and absorbing the linearly polarized light parallel an absorption axis 37 perpendicular to the transmission axis 36. In the green light L2 incident on the exit-side polarizing plate 28 from the wire grid element 26, the green light L2 passing through the exit-side polarizing plate 28 is incident on the color synthesizing unit 6.

As shown in FIG. 3, the liquid crystal panel 27 includes an element substrate 40, a counter substrate 41, a liquid crystal layer 42, and a compensating plate 43. The element substrate 40 is disposed to face the counter substrate 41. The liquid crystal layer 42 is sealed between the element substrate 40 and the counter substrate 41. The compensating plate 43 is disposed to be opposite to the liquid crystal layer 42 with respect to the counter substrate 41.

The green light L2 passing through the wire grid element 26 and incident on the liquid crystal panel 27 is incident on the compensating plate 43, passes through the counter substrate 41, is incident on the liquid crystal layer 42, and is reflected from the element substrate 40 to be reversed. The green light L2 is modulated while passing through the liquid crystal layer 42, exits from the liquid crystal layer 42, is incident on the counter substrate 41, passes through the compensating plate 43, and exits from the liquid crystal panel 27.

The element substrate 40 is configured by a silicon substrate or a glass substrate as a base substrate. When the element substrate 40 is formed of a silicon substrate, a so-called LCOS (Liquid Crystal On Silicon) is configured. The element substrate 40 includes a plurality of gate lines 44, a plurality of source lines 45, a plurality of thin film transistors (hereinafter, referred to as TFTs 46), and pixel electrodes 47.

The plurality of gate lines 44 extend to be parallel to each other. The plurality of source lines 45 extends to be parallel to each other. The gate lines 44 are perpendicular to the source lines 45. The TFT 46 is disposed at each of the intersections between the gate lines 44 and the source lines 45. The gate line 44 is electrically connected to a gate electrode of the TFT 46. The source line 45 is electrically connected to a source region of the TFT 46.

Each pixel P of the liquid crystal panel 27 corresponds to a portion surrounded by the gate lines 44 and the source lines 45. The pixel electrodes 47 are disposed so as to have a one-to-one correspondence relationship with the pixels P. In this embodiment, the pixel electrode 47 is made of a metal material and also functions as a mirror surface reflecting plate. FIG. 3 schematically shows the ground side of the pixel electrodes 47 by notching the pixel electrodes 47. In effect, the pixel electrodes 47 are configured to cover the gate lines 44, the source lines 45, and the TFTs 46 with a flattened layer or a insulation layer interposed therebetween, thereby improving an aperture ratio of the pixel P. The pixel electrode 47 is electrically connected to a drain region of the TFT 46. An alignment film (not shown) is disposed to cover the pixel electrode 47.

The counter substrate 41 is configured by a substrate, such as a glass substrate, having a transmission property as a base substrate. A common electrode made of a transparent conductive material such as indium tin oxide is disposed in the counter substrate 41 on the side of the liquid crystal layer 42. An alignment film is disposed in the common electrode on the side of the liquid crystal layer 42. The alignment film disposed in the element substrate 40 or the counter substrate 41 is an inorganic alignment film formed by, for example, an oblique evaporation method.

The liquid crystal layer 42 is configured by a VA mode liquid crystal layer. A cell gap between the element substrate 40 and the counter substrate 41 is, for example, about 2.0 μm. The liquid crystal material is sealed in the cell gap to form the liquid crystal layer 42. The liquid crystal material has negative dielectric constant anisotropy and birefringence Δn of, for example, 0.12.

The alignment property of the liquid crystal layer 42 is defined by the alignment film when no electric field is applied. A director of a liquid crystal molecule 48 included in the liquid crystal layer 42 has an angle (pretilt angle θ) of, for example, about 87°, which is formed by the thickness direction of the liquid crystal layer 42 and the direction parallel to the surface (the substrate surface of the element substrate 40) perpendicular to the thickness direction of the liquid crystal layer 42. An alignment axis 49 of the liquid crystal layer 42 is parallel to a vector obtained by orthogonally projecting the director of the liquid crystal molecule 48 to the plane perpendicular to the thickness direction of the liquid crystal layer 42.

The compensating plate 43 is disposed so as to cancel the dielectric constant anisotropy of the liquid crystal layer 42 by the pretilt and remove the dielectric constant anisotropy of both the liquid crystal layer 42 and the compensating plate 43 when no electric field is applied. The compensating plate 43 is formed of, for example, a negative C-plate. The compensating plate 43 is disposed so as to be rotated around a rotational axis from a position perpendicular to the thickness direction of the liquid crystal layer 42 on the assumption that a direction parallel to the axis, at which the alignment axis 49 is rotated by nearly 135° when viewed from the thickness direction of the liquid crystal layer 42, is the rotational axis. The compensating plate 43 is disposed to be inclined by nearly 4.5° with respect to a surface perpendicular to the thickness direction of the liquid crystal layer 42.

When a selection pulse is supplied to the gate line 44 in the liquid crystal panel 27 with the above-described configuration, the TFTs 46 connected to the gate line 44 are turned on. When the TFTs 46 are turned on, a source signal corresponding to a gray scale value of each pixel P is supplied to the source line 45 and the source signal is supplied to the pixel electrodes 47 via the TFTs 46. When the source signal is supplied to the pixel electrodes 47, an electric field is applied between the pixel electrodes 47 and the common electrode and the director of the liquid crystal molecules 48 of the liquid crystal layer 42 is changed in each pixel P in accordance with the electric field. The polarization state of the green light L2 incident on the pixel P is changed in accordance with the azimuth angle of the director of the liquid crystal molecules 48 of the liquid crystal layer 42 in this pixel P.

In this embodiment, when the electric field is not applied to the liquid crystal layer 42 in one arbitrary pixel P, the polarization state of the green light L2 incident on this pixel P is not nearly changed and the green light L2 exits in a P polarization state. When the electric field is applied to the liquid crystal layer 42 in one arbitrary pixel P, the green light L2 incident on this pixel P is changed from the P polarization to the S polarization with respect to the wire grid element 26 at a ratio corresponding to the gray scale value defined in image data. That is, in the green light L2 passing through the liquid crystal layer 42, the S-polarized light with respect to the wire grid element 26 is light for showing an image.

Referring back to FIG. 2, the color synthesizing unit 6 is configured by a dichroic prism or the like. The dichroic prism has a configuration in which four triangular prisms are adhered to each other. The surfaces to which the respective triangular prisms are adhered are the inner surfaces of the dichroic prism. In the dichroic prism, a wavelength selection film having a property of reflecting the red light L3 and transmitting the green light L2 and the blue light L1 and a wavelength selection film having a property of reflecting the blue light L1 and the transmitting the green light L2 and the red light L3 are perpendicular to each other to form the inner surfaces.

The green light L2 incident on the dichroic prism passes through the wavelength selection films and exits without any change. The blue light L1 and the red light L3 incident on the dichroic prism be selectively reflected from or pass through the wave selection films and exit in the same direction as the exit direction of the green light L2. In this way, the three-color light is superimposed and synthesized to form synthesized light for showing a full-color image, and then is incident on the projection optical system 7. The projection optical system 7 forms an image of the synthesized light on a projection surface to display the full-color image on the projection surface.

However, the alignment axis 49 of the liquid crystal layer 42 of the above-described liquid crystal panel 27 may be deviated from a predetermined direction due to an error or the like when the alignment film is formed. For example, when a plurality of liquid crystal panels are manufactured using a substrate broader than the liquid crystal panel, an organic alignment film is formed on the substrate by an oblique evaporation method or the like in some cases. In this case, in the plurality of liquid crystal panels manufactured using the substrate, the direction of the alignment axis of the liquid crystal layer is irregular since an evaporation angle is changed depending on the position of the liquid crystal layer on the substrate. As the deviation amount (error) increases from a predetermined direction of the alignment axis of the liquid crystal layer, the deviation amount increases from a predetermined direction of the polarization direction of the light emitted from the liquid crystal layer. As a result, the contrast ratio of a projected image may deteriorate due to an increase in a ratio of the light, which is included in the light reflected and projected from the wire grid element, for showing a reversed image.

In the projector 1 according to this embodiment, the direction of an optical axis of an optical element forming each image forming system is set in a manner described below. Therefore, it is possible to prevent the contrast ratio from deteriorating due to the deviation of the alignment axis 49 from a predetermined direction.

Figure 4:
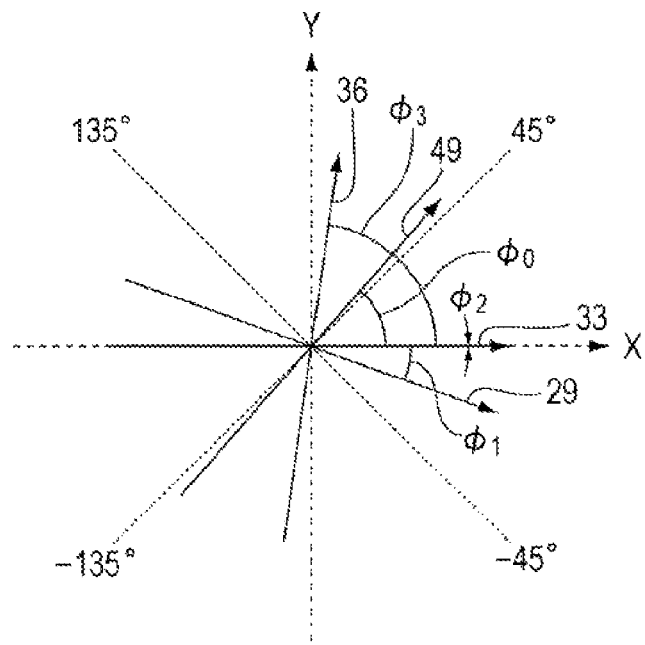
FIG. 4 is a diagram illustrating a first arrangement of optical elements of the image forming system according to the embodiment.

FIG. 4 is a diagram illustrating a first arrangement of optical elements of an image forming system according to this embodiment. FIG. 4 shows the optical elements of the green image forming system 4 which is a representative of the three image forming systems. Specifically, FIG. 4 is a plan view illustrating the directions of the transmission axis 29 of the incident-side polarizing plate 25, the transmission axis 33 of the wire grid element 26, the alignment axis 49 of the liquid crystal panel 27, and the transmission axis 36 of the exit-side polarizing plate 28 when viewed from the incident-side polarizing plate 25 in the normal direction of the liquid crystal panel 27.

The transmission axis 36 of the exit-side polarizing plate 28 in FIG. 4 is illustrated by projecting the transmission axis 36 to the surface of the wire grid element 26 in a direction parallel to the travel direction (the X direction) of the green light L2 reflected from the wire grid element 26 and traveling toward the exit-side polarizing plate 28 and by further projecting the transmission axis 36 projected to the wire grid element 26 to the pixel region 35 of the liquid crystal panel 27 in a direction parallel to the normal direction of the liquid crystal panel 27. The same is applied to the blue image forming system 3 and the red image forming system 5.

In this embodiment, a rotational angle of an optical axis of each optical element is a rotational angle measured from a reference direction within a plane perpendicular to the normal direction of the liquid crystal panel to the axis of a target, when a counterclockwise direction is a positive direction. In this embodiment, the reference direction is one (the X direction) of the two arrangement directions of the pixels P in the liquid crystal panel 27. Further, angles equal to or greater than 180° and less than 360° is treated as angles equal to or greater than −180° and less than 0°.

In the first arrangement, the alignment axis 49 of the liquid crystal layer 42 is present between the range equal to or greater than 45° and less than 90° and the range equal to or greater than −135° and less than −90°. That is, the angles of the alignment axis 49 formed with respect to the reference direction have two values (about 45° and −135°). In this embodiment, a rotational angle $\phi_0$ of the alignment axis 49 of the liquid crystal layer 42 is assumed to have a value between the two values of the angles of the alignment axis 49 formed with respect to the reference direction, when the absolute value of the angle of the alignment axis 49 formed with respect to the reference direction is less than 90°.

In the first arrangement, the transmission axis 29 of the incident-side polarizing plate 25 is present between the range greater than −45° and less than 0° and the range greater than 135° and less than 180°. In this embodiment, a rotational angle $\phi_1$ of the transmission axis 29 of the incident-side polarizing plate 25 is assumed to have a value between the two values of the angles of the transmission axis 29 formed with respect to the alignment axis 49, when the absolute value of the angle transmission axis 29 formed with respect to the alignment axis 49 is less than 90°.

In the first arrangement, the transmission axis 33 of the wire grid element 26 is almost parallel to the reference direction. In this embodiment, a rotational angle $\phi_2$ of the transmission axis 33 of the wire grid element 26 is assumed to have a value between two values of the angles (nearly 0° and nearly 180° in the first arrangement) of the transmission axis 33 formed with respect to the alignment axis 49, when the absolute value of the angle of the transmission axis 33 formed with respect to the alignment axis 49 is less than 90°.

In the first arrangement, the transmission axis 36 of the exit-side polarizing plate 28 is present between the range equal to or greater than 45° and less than 90° and the range equal to or greater than −135° and less than −90°. In this embodiment, a rotational angle $\phi_3$ of the transmission axis 36 of the exit-side polarizing plate 28 is assumed to have a value between two values of the angles of the transmission axis 36 formed with respect to the alignment axis 49, when the absolute value of the angle of the transmission axis 36 formed with respect to the alignment axis 49 is less than 90°.

The contrast ratio CR is a ratio ($T_W/T_B$) of a lightness $T_W$ of a pixel at the lightest display (hereinafter, referred to as light display) to a lightness $T_B$ of a pixel at the darkest display (hereinafter, referred to as dark display). The dark display is display when the pixel value of 256 gray scales is 0. The light display is display when the pixel value of 256 gray scales is 255.

The contrast ratio CR is the maximum value $CR_{MAX}$ when the lightness $T_W$ of the light display is the maximum value $T_{W\_MAX}$ and the lightness $T_B$ of the dark display is the minimum value $T_{B\_MIN}$ at the rotation angle $\phi_0$ of 45°, the rotation angle $\phi_1$ of 0°, the rotation angle $\phi_2$ of 0°, and the rotation angle $\phi_3$ of 90°. When the contrast ratio CR is 80% or more of the maximum value $CR_{MAX}$ in the projector, it is difficult to recognize the deterioration in the contrast ratio.

In the projector 1 according to this embodiment, the rotational angles $\phi_1$ to $\phi_3$ are set with respect to the rotational angle $\phi_0$ so that the absolute value of the difference between the rotational angles $\phi_0$ and $\phi_1$ is not 45° (where $|\phi_0-\phi_1|\neq 45°$, the lightness $T_W$ of the light display satisfies Equation (4) below, and the lightness $T_B$ of the dark display satisfies Equation (5) below. Thus, in the projector 1, the contrast ration CR can be set to be 80% or more of the maximum value $CR_{MAX}$, even when the lightness $T_W$ is the minimum value (0.95×$T_{W\_MAX}$) and the lightness $T_B$ of the dark display is the maximum value (1.2×$T_{B\_MIN}$):

$$0.95 \times T_{W\_MAX} \leq T_W < T_{W\_MAX} \quad (4), \text{ and}$$

$$T_{B\_MIN} < T_B \leq 1.2 \times T_{B\_MIN} \quad (5).$$

In this embodiment, the rotational angle $\phi_2$ of the transmission axis 33 of the wire grid element 26 is set so that the rotational angle $\phi_0$ of the alignment axis 49 of the liquid crystal layer 42 obtainable by measurement or the like satisfies Expression (1) below:

$$44° \leq \phi_0-\phi_2 < 45° \text{ or } 45° < \phi_0-\phi_2 \leq 46° \quad (1).$$

The lightness $T_W$ of the light display depends on a relation between the rotational angle $\phi_1$ of the transmission axis 29 of the incident-side polarizing plate 25 and the rotational angle $\phi_2$ of the transmission axis 33 of the wire grid element 26.

Figure 5:
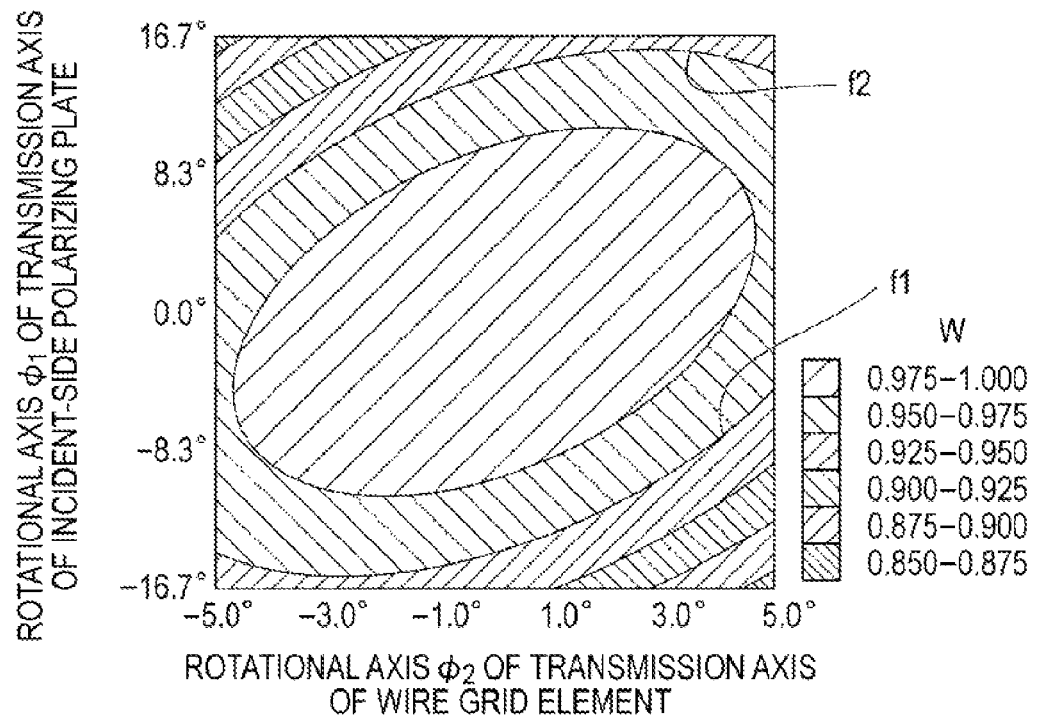
FIG. 5 is a distribution diagram illustrating a simulation result obtained by varying the rotational angle of the transmission axis of an incident-side polarizing plate and the rotational angle of the transmission axis of a wire grid element and examining a variation in the lightness of light display.

FIG. 5 is a distribution diagram illustrating a simulation result obtained by varying the rotational angle of the transmission axis of the incident-side polarizing plate and the rotational angle of the transmission axis of a wire grid element and examining a variation in the lightness of light display. In the distribution diagram of FIG. 5, the lightness W of the light display is a value ($T_W/T_{W\_MAX}$) obtained by normalizing the lightness $T_W$ of the light display by the maximum value $T_{W\_MAX}$.

As shown in the distribution diagram of FIG. 5, a contour of the lightness W of the light display has an elliptical shape having a straight line satisfying an equation of "$\phi_1=k1\times\phi_2$" as a major axis. The inventors have found out that the coefficient k1 is about 5.0 and the rotational angle $\phi_1$ of the transmission axis 29 of the incident-side polarizing plate 25 is sensitively changed with a change in the rotational angle $\phi_2$ of the transmission axis 33 of the wire grid element 26. Based on the distribution shown in FIG. 5, it can be understood that the lightness $T_W$ of the light display satisfies Equation (4) above when the rotational angle $\phi_1$ of the transmission axis 29 of the incident-side polarizing plate 25 satisfies Equation (2) below:

$$f1 \leq \phi_1 \leq f2 \quad (2),$$

where f1=0.191×$\phi_2^2$+0.986$\phi_2$−14.435 and f2=−0.191×$\phi_2^2$+0.986×$\phi_2$+14.435.

The lightness $T_B$ of the dark display depends on a relation between the rotational angle $\phi_3$ of the transmission axis 36 of the exit-side polarizing plate 28 and the rotational angle $\phi_2$ of the transmission axis 33 of the wire grid element 26.

Figure 6:
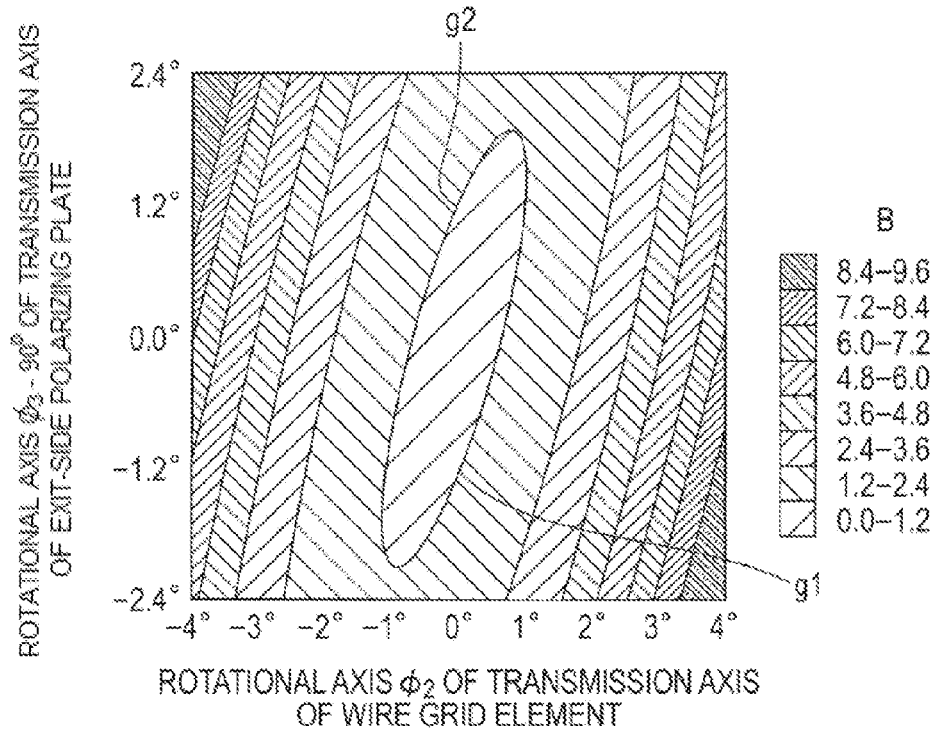
FIG. 6 is a distribution diagram illustrating a simulation result obtained by varying the rotational angle of the transmission axis of an exit-side polarizing plate and the rotational angle of the transmission axis of a wire grid element and examining the lightness of light display.

FIG. 6 is a distribution diagram illustrating a simulation result obtained by varying the rotational angle of the transmission axis of an exit-side polarizing plate and the rotational angle of the transmission axis of a wire grid element and examining the lightness of light display. In the distribution diagram of FIG. 6, the lightness B of the dark display is a value ($T_B/T_{B\_MIN}$) obtained by normalizing the lightness $T_B$ of the dark display by the minimum value $T_{B\_MIN}$.

As shown in the distribution diagram of FIG. 6, a contour of the lightness B of the dark display has an elliptical shape having a straight line satisfying an equation of "$\phi_3=k2\times\phi_2-90°$" as a major axis. The inventors have found out that the coefficient k2 is about 2.0 and the rotational angle $\phi_3$ of the transmission axis 36 of the exit-side polarizing plate 28 is sensitively changed with the change in the rotational angle $\phi_2$ of the transmission axis 33 of the wire grid element 26 at sensitivity different from that of the rotational angle $\phi_1$ of the transmission axis 29 of the incident-side polarizing plate 25. That is, as shown in FIG. 4, when the transmission axis 29 is projected to the liquid crystal panel 27, the transmission axis 29 of the incident-side polarizing plate 25 is not necessarily perpendicular to the transmission axis 36 of the exit-side polarizing plate 28. Based on the distribution shown in FIG. 6, it can be understood that the lightness $T_B$ of the dark display satisfies Equation (5) above when the rotational angle $\phi_3$ of the transmission axis 36 of the exit-side polarizing plate 28 satisfies Equation (3) below:

$$g1 \leq \phi_3 - 90° \leq g2 \quad (3),$$

where $g1=0.064\times\phi_2^3+0.841\times\phi_2^2+1.525\times\phi_2-1.46$ and $g2=0.064\times\phi_2^3-0.841\times\phi_2^2+1.525\times\phi_2+1.46$.

Figure 7:
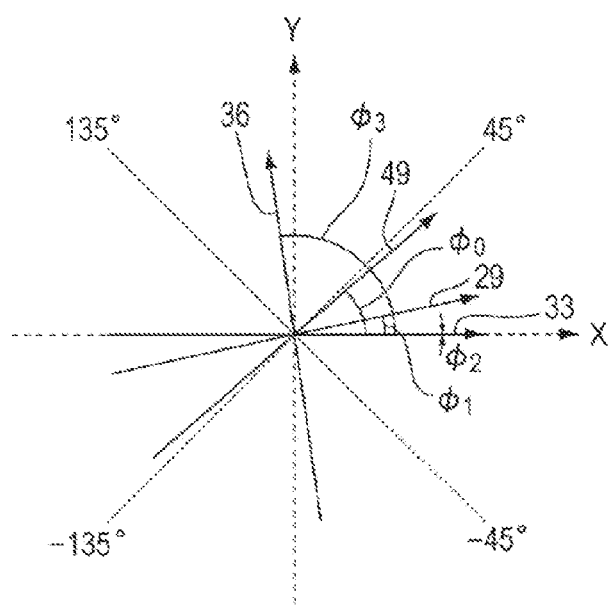
FIG. 7 is a diagram illustrating a second arrangement of the optical elements of the image forming system according to the embodiment.

FIG. 7 is a diagram illustrating a second arrangement of the optical elements of the image forming system according to the embodiment.

In the second arrangement shown in FIG. 7, the rotational angle $\phi_0$ of the alignment axis 49 of the liquid crystal layer 42 is set to be in the range greater than 0° and less than 45°. The rotational angle $\phi_1$ of the transmission axis 29 of the incident-side polarizing plate 25 is set to be in the range greater than 0° and less than 45°. The rotational angle $\phi_2$ of the transmission axis 33 of the wire grid element 26 is set to nearly 0°. The rotational angle $\phi_3$ of the transmission axis 36 of the exit-side polarizing plate 28 is set to be in the range greater than 90° and less than 135°. In the second arrangement, the rotational angles $\phi_0$ to $\phi_3$ are set so as to satisfy all Equations (1) to (3) above.

Figure 8:
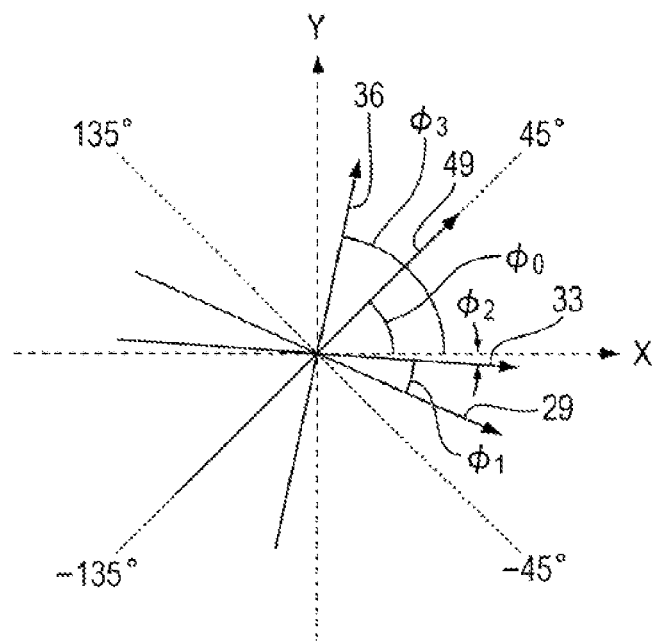
FIG. 8 is a diagram illustrating a third arrangement of optical elements of the image forming system according to the embodiment.

FIG. 8 is a diagram illustrating a third arrangement of optical elements of the image forming system according to the embodiment.

In the third arrangement shown in FIG. 8, the rotational angle $\phi_0$ of the alignment axis 49 of the liquid crystal layer 42 is set to about 45°. The rotational angle $\phi_1$ of the transmission axis 29 of the incident-side polarizing plate 25 is set to be in the range greater than −45° and less than 0°. The rotational angle $\phi_2$ of the transmission axis 33 of the wire grid element 26 is set to be in the range greater than −45° and less than 0°. The rotational angle $\phi_3$ of the transmission axis 36 of the exit-side polarizing plate 28 is set to be in the range greater than 45° and less than 90°. In the third arrangement, the rotational angles $\phi_0$ to $\phi_3$ are set so as to satisfy all Equations (1) to (3) above.

Figure 9:
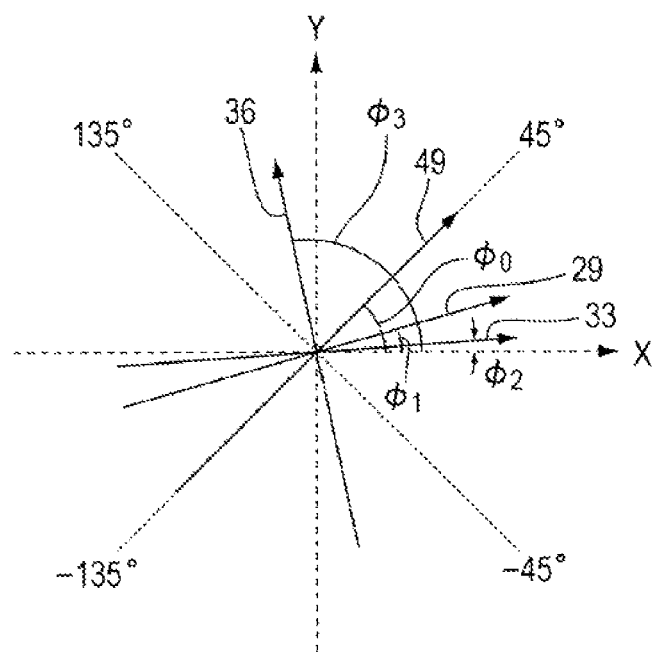
FIG. 9 is a diagram illustrating a fourth arrangement of the optical elements of the image forming system according to the embodiment.

FIG. 9 is a diagram illustrating a fourth arrangement of the optical elements of the image forming system according to the embodiment.

In the fourth arrangement shown in FIG. 9, the rotational angle $\phi_0$ of the alignment axis 49 of the liquid crystal layer 42 is set to about 45°. The rotational angle $\phi_1$ of the transmission axis 29 of the incident-side polarizing plate 25 is set to be in the range greater than 0° and less than 45°. The rotational angle $\phi_2$ of the transmission axis 33 of the wire grid element 26 is set to be in the range greater than 0° and less than 45°. The rotational angle $\phi_3$ of the transmission axis 36 of the exit-side polarizing plate 28 is set to be in the range greater than 90° and less than 135°. In the fourth arrangement, the rotational angles $\phi_0$ to $\phi_3$ are set so as to satisfy all Equations (1) to (3) above.

In the projector 1 with the above-described configuration, the rotational angles $\phi_0$ to $\phi_3$ are set so as to satisfy all Equations (1) to (3) above. Therefore, the lightness $T_W$ of the light display satisfies Equation (4) above and the lightness $T_B$ of the dark display satisfies Equation (5), the minimum value of the contrast ratio CR is 80% or more of the maximum $CR_{MAX}$. Accordingly, since the deterioration in the contrast ratio can be suppressed so that an observer does not recognize the deterioration in the contrast ratio, the projector 1 can display a high-quality image.

The deviation in the alignment axis 49 of the liquid crystal layer 42 can be compensated by adjusting the directions of the transmission axis 29 of the incident-side polarizing plate 25, the transmission axis 33 of the wire grid element 26, and the transmission axis 36 of the exit-side polarizing plate 28. Therefore, since the allowable range of the deviation degree (error) of the alignment axis 49 of the liquid crystal layer 42, the yield ratio of the liquid crystal panel 27 can be improved, thereby reducing the manufacture cost of the projector 1.

Since a displayed image is not rotated compared to a case where the deviation of the alignment axis 49 of the liquid crystal layer 42 is compensated by varying the position of the liquid crystal panel 27 with respect to the other optical elements, for example, there is low necessity to perform image processing or use an optical system to compensate the rotation of an image.

The technical scope of the invention is not limited to the above-described embodiments, but the invention may be modified in various formed within the scope of the invention without departing from the gist of the invention. The requisites described in the above-described embodiments may appropriately be combined. Further, at least one of the requisites described in the above-described embodiments may be omitted.

In at least one of the three image forming systems, the rotational angle $\phi_0$ of the alignment axis of the liquid crystal layer of the liquid crystal panel, the rotational angle $\phi_1$ of the transmission axis of the incident-side polarizing plate, the rotational angle $\phi_2$ of the transmission axis of the wire grid element, and the rotational angle $\phi_3$ of the transmission axis of the exit-side polarizing plate may be set so as to satisfy all Equations (1) to (3). For example, the above conditions may be satisfied in the green image forming system and the above conditions may not be satisfied in at least one of the blue image forming system and the red image forming system. Among the blue light L1, the green light L2, and the red light L3, the green light L2 is color light which has the highest human visual sensitivity (the optical absorptance of human pyramidal cells). Therefore, the contrast ratio can efficiently be improved.

In the above-described embodiment, the illumination optical system 2 is configured to separate the white light emitted from the light source lamp 13 into three-color light and illuminate each color image forming system for each color light, but the invention is not limited thereto. For example, the illumination optical system may be configured to include a solid-state light source, such as a laser diode or a light-emitting diode, directly emitting each color light and to illuminate each color image forming system by each color light emitted from each light solid-state light source.

Further, the illumination optical system may be configured to include a solid-state light source emitting blue light or ultraviolet light and a fluorescent body receiving the source light emitted from the solid-state light source and to illuminate the image forming system by the light emitted from the fluorescent body. In this configuration, the illumination optical system may be configured to combine the light emitted from the solid-state light source and the light emitted from the fluorescent body and form the white light and to separate the white light into three-color light and illuminate each color image forming system for each color light. Furthermore, the illumination optical system may be configured to separate the blue light emitted from a solid-state light source into a plurality of light fluxes by a half mirror or the like and to illuminate the blue image forming system by one of the separated light fluxes and illuminate the other color image forming systems by the light obtained by converging the colors of the other separated light fluxes by a fluorescent body.

In the above-described embodiment, a three-plate type projector has been described. The above-described projector may be a single-plate type projector such as a field sequential type projector. The projector described above in the embodiment may be used in a head-mounted display, a head-up display, and the like.

The entire disclosure of Japanese Patent Application No. 2011-064008, filed Mar. 23, 2011 is expressly incorporate by reference herein.

What is claimed is:

1. A projector comprising:
an illumination optical system;
an incident-side polarizing plate which is disposed at a position at which light emitted from the illumination optical system is incident;
a wire grid element which is disposed at a position at which the light passing through the incident-side polarizing plate is incident;
a liquid crystal panel which is disposed at a position at which the light passing through the wire grid element is incident; and
an exit-side polarizing plate which is disposed at a position at which light reflected by the wire grid element in the light modulated by the liquid crystal panel and incident on the wire grid element is incident,
wherein
a reference surface is perpendicular to the thickness direction of a liquid crystal layer of the liquid crystal panel,
a reference direction is parallel to the reference surface,
a rotational angle $\phi_0$ is an angle between an alignment axis of the liquid crystal layer projected to the reference surface and the reference direction,
a rotational angle $\phi_1$ is an angle between a transmission axis of the incident-side polarizing plate projected to the reference surface and the reference direction,
a rotational angle $\phi_2$ is an angle between a transmission axis of the wire grid element projected to the reference surface and the reference direction,
a rotational angle $\phi_3$ is an angle between the reference direction and a transmission axis of the exit-side polarizing plate projected to the wire grid element and further projected to the reference surface,
a lightness Tw is a lightness of the liquid crystal panel at a lightest display,
a lightness $T_{W\_MAX}$ is a lightness of the liquid crystal panel at a lightest display when the rotational angle $\phi_0$ is 45°, the rotational angle $\phi_1$ is 0°, the rotational angle $\phi_2$ is 0°, and the rotational angle $\phi_3$ is 90°, and
all Equations (1) to (3) below are satisfied:

$$44° \leq \phi_0 - \phi_2 < 45° \text{ or } 45° < \phi_0 - \phi_2 \leq 45° \quad (1)$$

$$f1 \leq \phi_1 \leq f2 \quad (2),$$

where $f1 = 0.191 \times \phi_2^2 + 0.986 \times \phi_2 - 14.435$ and $f2 = 0.191 \times \phi_2^2 + 0.986 \times \phi_2 + 14.435$, and $$0.95 \times T_{W\_MAX} \leq T_W < T_{W\_Max} \quad (3).$$

2. The projector according to claim 1, wherein the reference direction is one of two arrangement directions of pixels included in the liquid crystal panel.

3. The projector according to claim 2, wherein the rotational angle $\phi_0$ of the alignment axis of the liquid crystal layer from the reference direction is equal to or greater than about 45° and less than about 90°.

4. The projector according to claim 3, wherein the transmission axis of the wire grid element is substantially parallel to the reference direction.

5. The projector according to claim 4, wherein the rotational angle $\phi_1$ of the transmission axis of the incident-side polarizing plate from the reference direction is greater than about −45° and less than about 0°.

6. The projector according to claim 1, wherein
a lightness $T_B$ is a lightness of the liquid crystal panel at a darkest display, and a lightness $T_{B\_MIN}$ is a lightness of the liquid crystal panel at a darkest display when the rotational angle $\phi_0$ is 45°, the rotational angle $\phi_1$ is 0°, the rotational angle $\phi_2$ is 0°, and the rotational angle $\phi_3$ is 90°, and all Equations (4) to (5) below are satisfied:

$$g1 \leq \phi_3 - 90° \leq g2 \quad (4),$$

where $g1 = 0.064 \times \phi_2^3 + 0.841 \times \phi_2^2 + 1.525 \times \phi_2 - 1.46$ and $g2 = 0.064 \times \phi_2^3 - 0.841 \times \phi_2^2 + 1.525 \times \phi_2 + 1.46$.

$$T_{B\_MIN} < T_B \leq 1.2 \times T_{B\_MIN} \quad (5).$$

7. The projector according to claim 6, wherein the rotational angle $\phi_3$ of the transmission axis of the exit-side polarizing plate from the reference direction is equal to or greater than about 45° and less than about 90°.

* * * * *